Patented Sept. 14, 1937

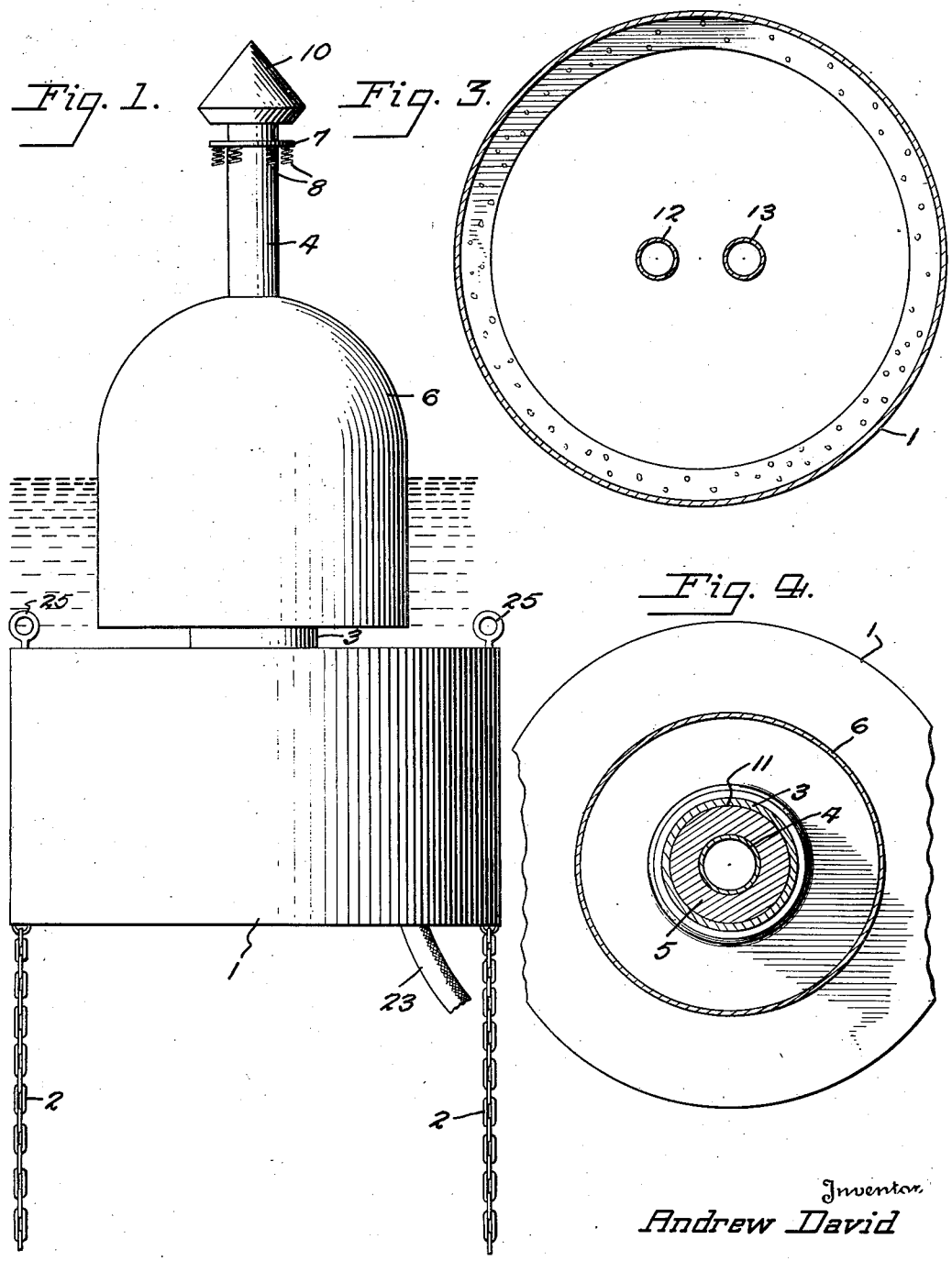

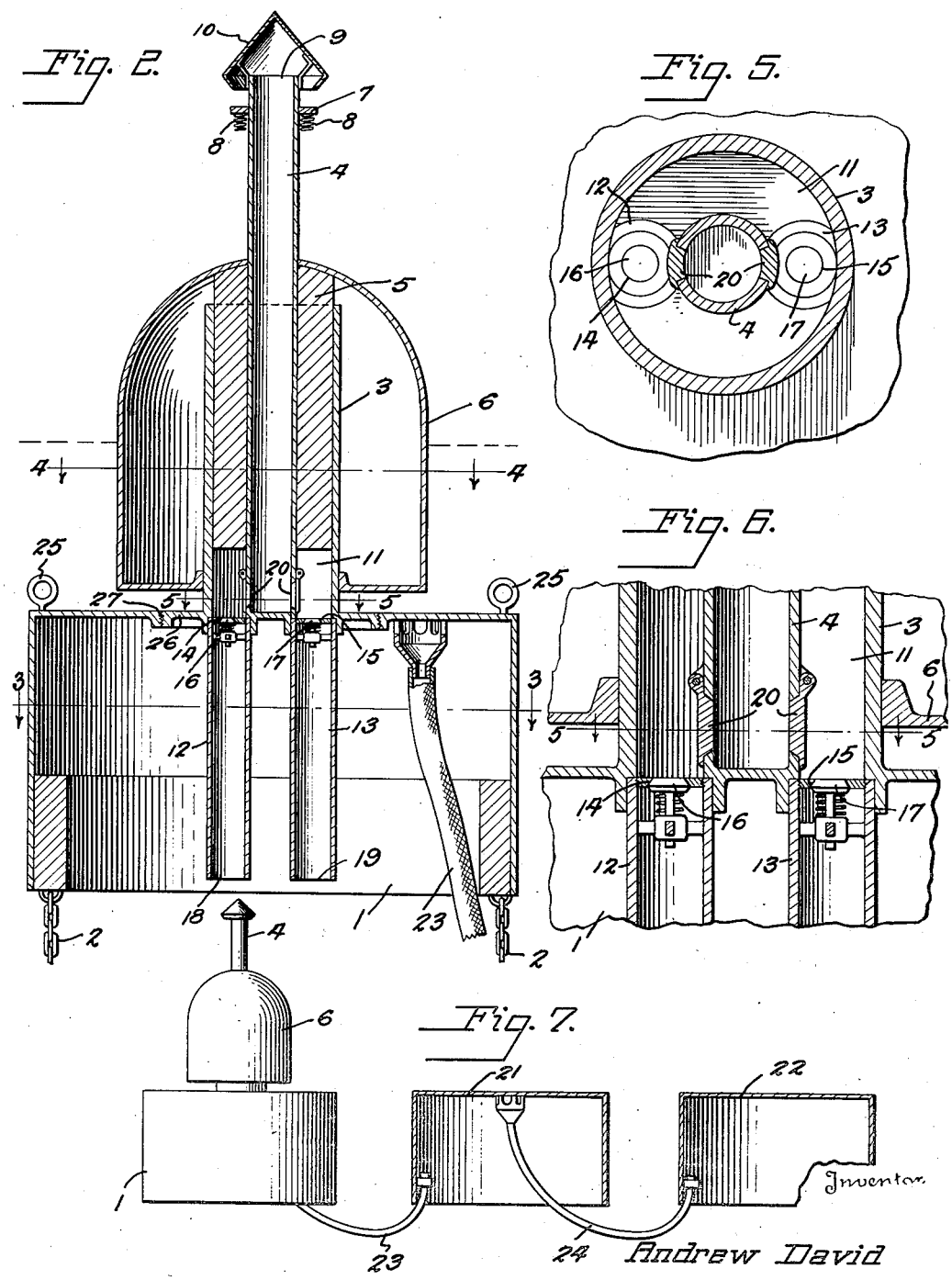

2,093,351

UNITED STATES PATENT OFFICE 2,093,351

WAVE MOTOR

Andrew David, Washington, D. C., assignor of one-half to Joel Kaufmann, Washington, D. C.

Application April 29, 1937, Serial No. 139,794

7 Claims. (Cl. 230—65)

This invention relates to wave motors. It has for one of its objects the provision of a wave motor that generates power through the weight of its piston.

Another object of the invention is to provide a wave motor which stores the power that it generates, through a medium of compressible fluid.

Still another object of the invention is the provision of a fluid pressure wave motor with proximate storage means, inherently subject to desultory movements caused by the waves, and transmitting its power by a flexible line through fluid pressure, to shore apparatus.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 1 is a vertical elevation of apparatus embodying the principles of invention;

Figure 2 is a vertical diametrical section;

Figure 3 is a cross section taken along the line 3—3 of Figure 2;

Figure 4 is a cross section taken along the line 4—4 of Figure 2;

Figure 5 is a cross section taken along the line 5—5 of Figures 2 and 6;

Figure 6 is a vertical fragmentary section on a slightly enlarged scale showing the valve mechanism; and Figure 7 is an elevational view partly in section showing the apparatus in connection with a series of storage tanks.

Referring now in detail to the several figures, the numeral 1 represents a bottomless tank 1 suitably moored as by the chains 2 in a body of water subject to wave action, the tank being buoyant, but being maintained by the length of the chains a slight distance below the water level.

Uprising from the tank is a hollow cylindrical guide 3 of such length as to extend a suitable distance above the surface of the water. Coaxial with the guide 3 and likewise secured to the tank 1 is the air inlet conduit 4, said conduit also functioning as a guide. A weighty piston 5 is slidable within the guide 3 and upon the guide 4. A hollow float 6 is secured to the piston 5, said float being of such buoyancy as to lift the piston when a wave rises around it, the piston falling by gravity as the wave recedes.

The length of the vertical range of travel of the float and piston is determined by the distance from trough to crest of the wave by which the apparatus is to be operated, and since the float and piston are of considerable weight, a range of movement is selected which is less than the height of the wave. A collar 7 is fixed to the upper part of the guide 4 and springs 8 are provided on the under-surface of the collar adapted to be engaged by the float and piston at the upper limit of its range of travel for cushioning the impact of the float and piston relative to said collar. The conduit 4 has an air inlet 9 at its upper end protected by a hood 10 against the ingress of spray. The length of the conduit 4 above the water level is such that it is above the waves.

The annular space 11 within which the piston 5 reciprocates terminates at the upper wall of the cylinder. Below said wall are a pair of pipes 12 and 13 which communicate with the space 11 by way of valve ports 14 and 15. The number of pipes is immaterial. Two are shown by way of convenience, but a greater or smaller number than two may be employed. The valve ports 14 and 15 are closed by check valves 16 and 17 which open toward the pipes 12 and 13. The lower ends 18 and 19 of said pipes terminate a slight distance above the plane of the lower edge of the tank 1. The air inlet conduit 4 has one or more valves 20 closing ports which communicate with the piston cylinder 11, said valves opening toward said piston cylinder.

In operation, the float 6 is lifted by a wave, carrying the piston 5 in an upward direction. This movement produces suction in the space 11 which opens the valves 20 and permits atmospheric air to be drawn in at the top of the conduit 4 and through the valves 20 into the space 11. The wave recedes, the piston descends by gravity forcing the air from the space 11 through the check valves 16 and 17 into the pipes 12 and 13. The air escapes from the lower ends of these pipes and bubbles up to the top of the tank 1, displacing water. By successive movements of the piston, the tank 1 becomes almost filled with compressed air. The piston acts against a head equal to the depth of the water level in the tank 1 below the water level on the outside. The pressure developed by the piston is equal to its weight multiplied by a factor which is the quotient of the cross sectional area of the float 6 divided by the cross sectional area of the conduit 4.

If the tank 1 extended down deep enough into the water the head pressure opposing the piston would finally reach such a value that the piston would be at the limit of its power to compress, and its stroke would be nil. Long before this, the efficiency of the piston would be greatly reduced by the sluggishness of its movement, the wave passing before the piston had moved more than a fraction of its stroke. To keep the wave motor operating at a high degree of efficiency, it is therefore proposed to make the tank 1 comparatively shallow so that the air pumped thereinto will never be opposed by a very considerable head of water and to provide other tanks 21 and 22 serially connected with the tank 1 by flexible means such as the hoses 23 and 24 so that a large aggregate volume of air will be stored in the several tanks at a moderately high pressure permitting the pump to work with a high degree of efficiency.

For the purpose of servicing the apparatus, suitable rings 25 are provided secured to the tank 1 and into which a hook may be inserted attached to suitable hoisting apparatus for pulling the tank 1 up above the surface of the water.

It will be observed that the float, piston, inner and outer guides and the pipes 12 and 13 are unitarily associated with a plate 26 which is part of the cover of the tank 1, and which screws into a threaded opening 27 in the top of said tank. When the tank has been brought to the surface of the water, this unit may be bodily removed by unscrewing the plate 26 from the top of the tank. For safety's sake, if desired, the opening in the top of the tank may be temporarily closed by a plate not shown, and the tank 1 then released into the water, the place of its location being marked by a suitable buoy which may be attached to one of the rings 25. The unit comprising the piston, guides, and the appurtenant parts may then be taken away to be over-hauled or repaired.

While I have in the above description disclosed what I believe to be a preferred and practical embodiment of my invention, it is to be understood to those skilled in the art that the details of construction as shown and described are merely by way of example and not to be construed as limiting the scope of the invention as claimed.

What I claim is:

1. Wave motor comprising an open bottomed tank adapted to be maintained submerged at a fixed depth, a hollow cylindrical guide fixed to the top of said tank and in communication therewith, of such length as to extend above the surface of the water, a cylindrical air conduit smaller than said guide mounted coaxially therewith defining an annular space forming a compression cylinder, said air conduit extending to such height as to be above the peak of the wave, a heavy annular piston reciprocable within said cylinder between said guide and air conduit, a wave-lifted float secured to said piston, valve controlled ports between said air conduit and cylinder and a valve controlled passage between said cylinder and the interior of said tank.

2. Wave motor comprising a tank adapted to be maintained submerged at a fixed depth, a hollow cylindrical guide fixed to the top of said tank of such length as to extend above the surface of the water, one or more pipes fixed to said tank, communicating with the interior of said cylindrical guide and extending to a plane slightly within but adjacent to the plane of the lower edge of said tank, a heavy piston reciprocable in said guide, a wave-lifted float secured to said piston, an air inlet conduit communicating with the interior of said guide below said piston, and an inwardly opening check valve between said air conduit and the interior of said guide below said piston and outwardly open check valves between the interior of said guide below said piston and said pipes.

3. Wave motor comprising an open bottomed tank adapted to be submerged at a fixed depth, a hollow cylindrical guide fixed to the top of said tank and of such length as to extend above the surface of the water, one or more pipes on the inside of said tank communicating with the interior of said cylindrical guide and terminating within but adjacent to the plane of the lower edge of said tank, an air conduit fixed to said tank coaxial with said guide and of smaller diameter defining an annular space within said guide, a heavy piston reciprocable in said annular space, a wave-lifted float secured to said piston, said air conduit extending to such height as to be above the height of the wave peak, and open at its outer end, a check valve between said air conduit and the interior of said guide below said piston, outwardly opening check valves between the interior of said guide below said piston and said pipes, and a buffer on said air conduit for limiting the upward range of movement of said float and piston.

4. Wave motor as claimed in claim 3, including a hood on the top of said air conduit.

5. Wave motor as claimed in claim 3, including a flexible conduit communicating with the interior of said tank near the upper part thereof for discharging the compressed air from said tank.

6. In combination with a wave motor as claimed in claim 3, one or more additional tanks moored at substantially the level of said first mentioned tank and flexibly and serially connected.

7. Wave motor comprising an open bottomed tank adapted to be maintained submerged at a fixed depth, a removable plate forming part of the top of said tank having unitarily attached thereto on the upper side a hollow cylindrical guide forming a cylinder for a piston, and on the under-side thereof one or more pipes of such length as to extend to a plane within but adjacent to the plane embracing the lower edge of said tank, said pipes and said cylinder communicating by means of ports having check valves opening toward said pipes, an air conduit fixed to the upper side of said plate smaller than said guide and coaxial therewith defining an annular space, a heavy annular piston reciprocable within said space, a wave-lifted float secured to said piston, valves in said air conduit opening toward said cylinder below said piston, said plate with the parts unitarily related thereto being removable from said tank.

ANDREW DAVID.